United States Patent Office 3,022,256
Patented Feb. 20, 1962

3,022,256
POLYURETHANE FOAM AND METHOD OF PREPARING SAME
Robert K. Barnes, Charleston, Robert W. McLaughlin, Belle, and Fritz Hostettler, Charleston, W. Va., assignors to Union Carbide Corporation, a corporation of New York
No Drawing. Filed Aug. 10, 1959, Ser. No. 832,470
13 Claims. (Cl. 260—2.5)

This invention relates to foamed polymers derived from isocyanate-modified alkylene oxide addition products of certain substituted tetrahydropyrans, and to their method of preparation.

It has been proposed heretofore to prepare foamed polymers by forming a polyester of a triol and a dicarboxylic acid, e.g., glycerol or trimethylol propane with adipic acid, and reacting the terminal active hydrogens of the polyester with a diisocyanate. The isocyanate-modified polyester is simultaneously or stepwise foamed by internal development of carbon dioxide and cross linking of the modified polyesters or by means of a blowing agent which vaporizes at or below the temperature of the foaming mass. Foams of this type have given promise of finding wide utility in the field of insulation and structural reinforcement. They also have given promise of being more versatile in that they can be foamed in place and thereby effect an obvious savings in labor and handling.

The discovery has now been made that foamed polymers of widely varying and preselected properties can readily be prepared from isocyanate-modified alkylene oxide addition products of substituted tetrahydropyrans. The foamed polymers of the invention can be rigid or flexible, open-celled or closed-celled and the flexible foams may be resilient or flaccid. The alkylene oxide-tetrahydropyran addition products hereinafter described are especially suited for obtaining rigid foams which are characterized by good compression strengths.

The foamed products of the invention have the advantage of being capable of preparation without the application of external heat and of having high and low density by suitable modification, good resistance to solvents, and little tendency to support combustion. Another advantage that is most desirable from a commercial point of view is that the difficulties heretofore experienced in removing water of condensation from the polyesters and of keeping water out of the reaction until the proper time is very much reduced in that the alkylene oxide addition products utilized herein are formed without formation of water of condensation.

As used herein throughout the specification and claims, the term "isocyanate" refers to organic polyisocyanates. The term "residue," in reference to organic polyisocyanates, refers to the organic portion of an isocyanate compound exclusive of the reactive isocyanate groups. The term "isocyanate-modified . . . addition products" refers to an alkylene oxide-tetrahydropyran reaction product in which the hydroxyl groups thereof are connected to organic polyisocyanate residues by means of a urethane linkage. The term "polyalkyleneoxy" as employed herein refers to at least one or more alkylene groups separated by a divalent oxy group.

In accordance with this invention urethane foams are prepared by forming a foamant polymer having reactive hydroxyl groups which comprises an alkylene oxide addition product of a substituted tetrahydropyran compound, extending the polymer, building up the network polymer and developing the foam reaction thereof by means of water and polyisocyanate. The network formation and building up of the foam can take place substantially simultaneously, as in the so called "one shot method," or in more or less distinct steps as in the semiprepolymer technique. For most economical operation and directness of procedure, as well as continuous operation, it is preferred to prepare the foamant, i.e., the alkylene oxide-tetrahydropyran addition product, in a first stage and then effect substantially simultaneous network and foam development in a second stage by admixing the foamant, polyisocyanate and water in the presence of a catalyst, or by partially extending the foamant with excess isocyanate and then adding additional foamant and water in a subsequent stage. The various stages can be extended to the point of becoming distinct or accelerated to the extent of making the successive stages almost simultaneous.

The foamant polymer or alkylene oxide-tetrahydropyran reaction product of the first stage is prepared by reaction of an alkylene oxide with a substituted tetrahydropyran compound selected from the group consisting of 3,3,5,5 - tetrakis(hydroxymethyl) - 4 - hydroxy - tetrahydropyran; 3,3,5 - tris(hydroxymethyl) - 5 - methyl - 4 - hydroxy-tetrahydropyran; and 3,5-(hydroxymethyl)-3,5-dimethyl-4-hydroxy-tetrahydropyran. The reaction products are identified as hydroxypolyalkyleneoxy ethers of tetrahydropyrans which are characterized by the presence, in their molecular structure, of hydroxyl-terminated chains of alkylene links, substituted or unsubstituted, which are connected to one another by means of recurring divalent oxy groups. The reaction products are believed to be mixtures which contain products generally represented by the formula:

I

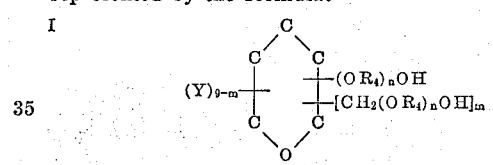

in which Y represents a hydrogen atom or lower alkyl group containing 1 to 6 carbon atoms; $R_4$ is a member of the class of ethylene radicals, propylene radicals or mixtures thereof; $m$ is an integer of 2 to 4; and $n$ is a number having a value of at least one.

The substituted tetrahydropyran starting materials used for reaction with alkylene oxides are derivatives of 4-hydroxy-tetrahydropyrans which contain two to four hydroxymethyl groups, i.e., —$CH_2OH$, directly attached to carbon atoms that are separated by one carbon atom from the heterocyclic oxygen in the tetrahydropyran ring. The hydroxymethyl groups can be the sole substituents attached to the 4-hydroxy-tetrahydropyran ring, as for example, 3,3,5,5 - tetrakis(hydroxymethyl) - 4 - hydroxy-tetrahydropyran, or the ring may have attached to it other substituents as characterized by (Y) in Formula I above, e.g., a lower alkyl group containing 1 to 6 carbon atoms. Other monovalent radicals may be substituted in the ring structure provided they do not interfere with reaction between the alkylene oxide and substituted tetrahydropyrans under the reaction conditions employed.

The tetrahydropyran starting materials are well known compounds and have been described in the literature. In general the hydroxymethyl tetrahydropyrans can be prepared by the condensation of formaldehyde with various ketones which possess active hydrogen atoms, such as acetone, methyl ethyl ketone or diethyl ketone, at temperatures between about 50 and 100° C. in the presence of a metal-containing basic catalyst. The products of the reaction, after removal of water, include a mixture of hydroxy compounds some of which may be recovered as single compounds of definite composition. In this respect the tetrahydropyran starting materials employed for purposes of the invention may be discrete compounds or a mixture of isomers together with a small amount of higher molecular weight condensation products as obtained in the preparation of such compounds.

The alkylene oxide adducts are obtained by reacting the tetrahydropyran compounds above described with a 1,2-alkylene oxide selected from the group of ethylene oxide, propylene oxide, or mixtures thereof. The reaction is conducted in the presence of a small amount of catalyst by adding the alkylene oxide to the tetrahydropyran material which is preferably stirred and in a molten condition. If desired, the tetrahydropyran can be slurried in an inert solvent, e.g., dioxane, isopropyl ether, etc., and then reacted with alkylene oxide. The reaction is carried out under atmospheric or superatmospheric pressure at temperatures of about 110 to 170° C. and to the extent required any conventional heat transfer means can be used to remove the exothermic heat of reaction.

The amount of alkylene oxide to be reacted with the tetrahydropyran is determined by the average molecular weight of the product desired. For the alkylene oxide-tetrahydropyran addition products described herein which have utility as intermediates in the preparation of foams, the molecular weights, based on the hydroxyl value, can range from about 350 to 10,000 or more. To obtain such products having the desired molecular weights the tetrahydropyran starting materials are treated with the 1,2-alkylene oxide until each adduct represented in Formula I above by $-(OR_4)_nOH$ contains at least one mole of alkylene oxide, and preferably at least about three moles. Within these limits, of course, the addition of alkylene oxide to each hydroxyl can be balanced or unbalanced, i.e., each may contain approximately the same or different average number of alkylene oxide groups per chain. For high molecular weight products the total moles of alkylene oxide reacted with each hydroxyl group can range from one to about 100 moles, or more.

The time required for completion of the alkylene oxide addition will vary. In general a longer time of alkylene oxide addition is required for products of high molecular weight whereas with a low molecular weight product the reaction is faster and the addition time is short. Additionally, at lower temperatures than those above described, the alkylene oxide addition for high molecular weight products, e.g., 10,000 or more, may require an impractical amount of time such as several weeks. For the products hereinafter prepared, the time required for alkylene oxide addition ranged from about 6 hours to several days.

In carrying out the alkylene oxide reaction any of the known catalysts for this type of addition reaction can be employed. The preferred catalysts are alkaline catalysts, e.g., alkali metal catalysts such as sodium hydroxide, potassium hydroxide and potassium t butoxide. The amount of catalyst employed may be in the range of 0.002 to 2.0 percent by weight, based on the total amount of reactants, including the alkylene oxide or mixtures thereof appearing in the reaction product. An amount of active catalyst within this range is not so large as to cause difficulty in removal of catalyst or introduction of inorganics in the final products, and good results have been obtained with about 0.03 to 0.5 percent by weight, based on the total reactants of potassium t butoxide. All of the catalyst need not be added at the start of the reaction. If desired, a suitable amount may be initially added and the remainder of the catalyst added from time to time throughout the course of the reaction to maintain a substantially constant catalyst concentration. Any alkaline material contained in the foamant polymer is preferably neutralized by ion exchange resins or acidified slightly by addition of acids or acid chlorides.

As above mentioned, the molecular weight of the foamant polymers, i.e., the hydroxypolyalkyleneoxy-tetrahydropyrans, depends upon the amount of alkylene oxide utilized in the reaction. The average molecular weight and reactivity of the foamant polymers with an isocyanate can be determined readily by analysis for hydroxyl content. The hydroxyl number is a measure of and is proportional to the hydroxyl concentration per unit weight. The hydroxyl number is defined in terms of milligrams of KOH equivalent per gram of alkylene oxide-tetrahydropyran reaction product and is determined by reacting acetic anhydride (in pyridine solution) at refluxing temperature with the hydroxyl groups of the reaction product. The unreacted anhydride and acetic acid formed are titrated with aqueous NaOH using phenolphthalein as an indicator. The molecular weight can be readily calculated from the hydroxyl number by using the formula:

$$M.W. = \frac{Functionality \times 1000 \times 56.1}{Hydroxyl\ No.}$$

It will become apparent from the foregoing that the foamant polymers prepared can be "tailor-made" to best suit the particular type of foamed polymers ultimately desired. Their molecular weight can be controlled accurately by a preselected proportioning of the alkylene oxide reacted with the hydroxyl-substituted tetrahydropyran compounds.

The relative proportions of alkylene oxide and substituted tetrahydropyran compound are chosen with a view to the characteristics desired in the foamant and in the foamed product. It may be stated as a general guide that foams of maximum rigidity are prepared by the use of foamants within a molecular weight range of about 350 to 1250; for semirigid foams the molecular weight of the foamant should be about 800 to 1800; and for flexible open-cell foams the foamant should be of increased chain length and have molecular weights of about 1800 to 6000.

It is to be understood that the alkylene oxide-tetrahydropyran addition products described herein include not only the products prepared by reaction of a single alkylene oxide and a hydroxyl-substituted tetrahydropyran compound, but also those involving the reaction of two different alkylene oxides. It is also to be understood that the terms "foamant," "foamant polymer" and "alkylene oxide-tetrahydropyran addition product" are used interchangeably to identify the hydroxypolyalkyleneoxy ethers of tetrahydropyrans illustrated in Formula I, supra.

After preparation of the alkylene oxide-tetrahydropyran foamant polymers, the foaming operation can be carried out continuously or batchwise. The one-shot method, involving substantially simultaneous isocyanate extension of the foamant, cross linking and foam formation, is the most direct and economical. The semiprepolymer technique, involving partial extension of the foamant with excess isocyanate followed by foaming and network development at a later stage, is desirable when the final processing is to be kept to a minimum. It is also desirable, in the case of flexible foams, to form a prepolymer by preacting molar equivalents of the foamant and isocyanate in the absence of water and thereafter producing a foam by the addition of excess isocyanate, a catalyst, water and a surfactant.

The amount of polyisocyanate reacted with the foamant polymer in preparation of a flexible, rigid or semirigid foam should be in excess of the equivalent amount required for reaction with each hydroxyl group of the foamant. The amount employed will be sufficient to have present in the total mass at least more than one equivalent of polyisocyanate, regardless of how combined, per equivalent of the foamant polymer. In other words, the amount of isocyanate compound employed must be such that there is more than the theoretical amount required to form a urethane linkage by reaction of hydroxyl and isocyanato groups. In accordance therewith, the amount of polyisocyanate employed is from about 1.05 to 7, preferably 2 to 6, equivalents per equivalents per equivalent of foamant polymer.

The reaction of a foamant polymer containing three hydroxyl groups with excess isocyanate, such as a diisocyanate, can be illustrated by the formula:

II

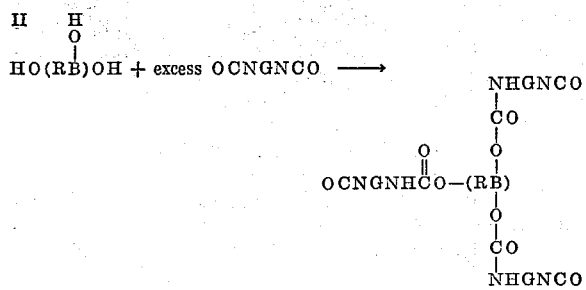

in which RB stands for the alkylene oxide-tetrahydropyran addition product of the first stage exclusive of the terminal hydroxyl groups and G stands for an aliphatic, cycloaliphatic or aromatic diisocyanate, exclusive of the reactive isocyanato groups, such as m- and p-phenylene diisocyanates; 2,4- and 2,6-toluene diisocyanates; 2,3,5,6 - tetramethyl - para - phenpylene diisocyanate; o-, m-, and p-xylene diisocyanates; 4,4'-biphenylene diisocyanate; 3,3'-dimethyl-4,4'-biphenylene diisocyanate; 3,3' - dimethyoxy - 4,4' - biphenylene diisocyanate; p,p'-bibenzyl diisocyanate; p,p'-diphenylmethane diisocyanate; 4,4'-methylene-bis-ortho-tolyl diisocyanate; 1,5-naphthanene diisocyanate; tetramethylene diisocyanate; hexamethylene diisocyanate; and various other diisocyanates such as those listed in the table of Siefken (Annalen, 562, pages 122–135, 1949).

Branched isocyanate-modified foamant polymers are also obtainable, in accordance with the invention, by reacting the foamant polymer with an isocyanate having more than two reactive isocyanato groups, as illustrated by the equation:

III

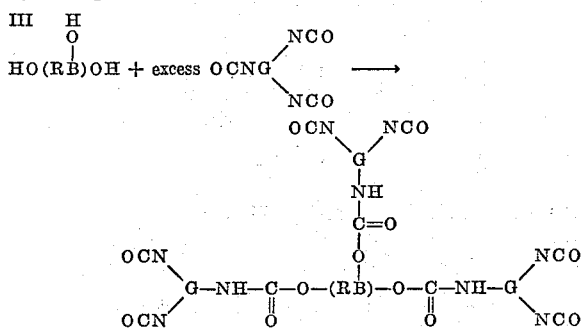

A number of suitable higher functional polyisocyanates are listed in the table of Siefken, referred to earlier. One of the more attractive types of polyisocyanates useful for this purpose is the product

IV

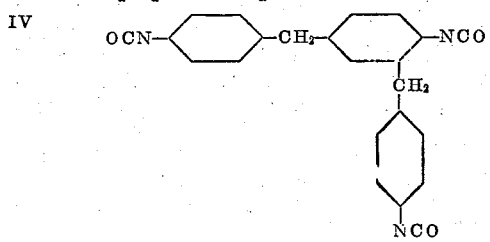

as well as the isomers thereof, obtainable by phosgenation of the reaction product of aniline and formaldehyde.

The reaction of the foamant polymer with the polyisocyanate, which is exothermic, can be accomplished at temperatures varying from room temperature, i.e., about 24° C., up to temperatures of about 200° C. The upper limit of reaction temperature is based on the thermal stability of the foamant-isocyanate reaction product whereas the lower limit is determined by the lowest economical rate of reaction. Generally at temperatures below about 75° C. the reaction is too slow to be feasible unless a catalyst is employed. At temperatures higher than about 300° C. there is danger of destructive decomposition of the reactants and reaction products. If the isocyanate-modified foamant is a prepolymer and is to be stored before use, it is preferably to carry out the reaction with isocyanate in the absence of a catalyst and at temperatures within the range of about 80 to 120° C. The time of reaction will vary of course depending upon temperature as well as upon the absence or presence of a catalyst or retarder and the identity thereof.

It is often desirable in the preparation of a prepolymer to add a retarder during or after the isocyanate reaction especially if the isocyanate-modified foamant is intended to be stored. This not only slows down, as the name implies, the rate of reaction between hydroxyl and isocyanato groups, but also inhibits reaction between the urethane groups formed and the isocyanato groups. Among the suitable retarders are acids such as hydrochloric acid, sulfuric acid, phosphoric acid, boric acid, various organic acids, organic acid halides such as acetyl chloride and acetyl bromide, sulfonyl halides such as para-toluene sulfonyl chloride, inorganic acid halides such as phosphorus tribromide, phosphorus trichloride, phosphorus oxy chloride, sulfonyl chloride and thionyl chloride, as well as sulfur dioxide and acidic sulfones.

When it is desired to form a foam, a mixture of the isocyanate-modified foamant and excess unreacted isocyanate is mixed with water, preferably in the presence of a catalyst. This involves several reactions that proceed simultaneously. One illustrated schematically in the equation:

V

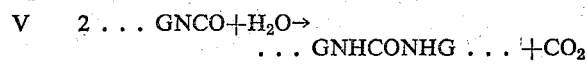

involves the reaction between the isocyanato groups and water to form urylene links and carbon dioxide. This reaction has the important effect of producing carbon dioxide in situ for forming the voids of the final foamed product and also of linking the terminal isocyanato groups and thereby extending the isocyanate-modified foamant. Another of the reactions involves reaction of the urylene links so formed with unreacted isocyanato groups to form biuret cross links as illustrated by the equation:

VI

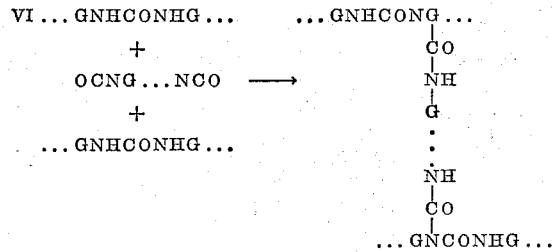

In addition, the free isocyanates react with one another, as shown in Equation VI, and with the isocyanates represented in Equations III to V to form chains of isocyanate residues connected to one another and to the isocyanate-modified foamants by urylene groups. The formation of a good foam depends upon a simultaneous development of carbon dioxide and a cross linking of the molecules to trap the carbon dioxide and thus prevent collapse of the foam.

Depending upon the desired density of the foam and the amount of cross linking desired, the amount of water added should be such that the ratio of equivalents of water to residual isocyanate equivalents, i.e., the isocyanate which is present as excess isocyanate over the reactive groups of the foamant polymer, is preferably kept within the range of from 0.5:1.0 to 1.5:1.0 and most preferably within a range of about 0.8:1 to 1.2:1.

The foaming operation also can be effected by means of a blowing agent, such as a low boiling, high molecular weight gas, which vaporizes at or below the temperature of the foaming mass. In rigid foams intended for use as thermal insulators the incorporation of a gas lowers its heat conductivity. Hence when a fluorocarbon gas such as trichloromonofluoromethane, "Ucon 11," is used in blowing rigid foams, a lower K factor is obtained than in rigid foams of equal density blown with air or carbon dioxide. The reactions that occur during this type operation include formation of the urethane linkage as well as the formation of isocyanate dimers and trimers. In addition, another reaction that can occur is the formation of allophanate structures, as illustrated by the equation:

VII

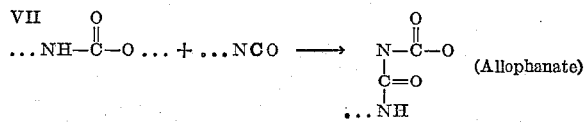

(Allophanate)

Preferred blowing agents are the fluorocarbons such as trichloromonofluoromethane; dichlorodifluoromethane; dichlorofluoromethane; 1,1-dichloro-1-fluoroethane; 1-chloro, 1,1-difluoro, 2,2-dichloroethane; and 1,1,1-trifluoro, 2-chloro-2-fluoro, 3,3-difluoro, 4,4,4-trifluorobutane. The amount of blowing agent used will vary with density desired in the foamed product. In general it may be stated that for 100 grams of resin mix containing an average NCO/OH ratio of 1 to 1, about 0.005 to 0.3 mole of gas are used to provide densities ranging from 30 to 1 lbs. per cubic foot. If desired, water may be used in conjunction with the blowing agent.

Catalysts that are suitable for the foaming and cross linking or curing reaction include inorganic bases such as sodium hydroxide, sodium methylate, sodium phenolate, tertiary amines and phosphines. Particularly suitable amine catalysts include 2,2,1-diazabicyclooctane, trimethylamine, 1,2-dimethylimidazole, triethylamine, diethyl cyclohexylamine, dimethyl long chain $C_{12}$ to $C_{18}$ amines, dimethylaminoethanol, diethylaminoethanol, N-methyl morpholine, N-ethyl morpholine, triethanolamine and the like. Other suitable catalysts include arsenic trichloride, antimony trichloride, antimony pentachloride, antimony tributoxide, bismuth trichloride, titanium tetrachloride, bis(cyclopentadienyl) titanium difluoride, titanium chelates such as octylene glycol titanate, dioctyl lead dichloride, dioctyl lead diacetate, dioctyl lead oxide, trioctyl lead chloride, trioctyl lead hydroxide, trioctyl lead acetate, copper chelates such as copper actylacetonate, and mercury salts.

Organic tin compounds characterized by at least one direct carbon to tin valence bond are also suitable as catalysts for the foaming reaction. Among the many types of tin compounds having carbon to tin bonds, of which specific representative compounds have been tested and shown to be active, are tin compounds having the general formulae set forth below:

(a) $R_3SnX$
(b) $R_2SnX_2$
(c) $RSnX_3$
(d) $R_2SnY$
(e) $RSnOOR'$
(f) $R(SnOOR')_2$ (g)

$$X\left[\begin{array}{c}R\\-SnO-\\R\end{array}\right]_n\begin{array}{c}R\\-Sn-X\\R\end{array}$$

(h) $R_2Sn(YRX)_2$ in which R's represent hydrocarbon or substituted hydrocarbon radicals such as alkyl, aralkyl, aryl, alkaryl, alkoxy, cycloalkyl, alkenyl, cycloalkenyl, and analogous substituted hydrocarbon radicals, the R''s represent hydrocarbon or substituted hydrocarbon radicals such as those designated by the R's or hydrogen or metal ions, the X's represent hydrogen, halogen, hydroxyl, amino, alkoxy, substituted alkoxy, acyloxy, substituted acyloxy, acyl radicals or organic residues connected to tin through a sulfide link, and the Y's represent chalcogens including oxygen and sulfur.

Among the compounds of group (a) that deserves special mention are trimethyltin hydroxide, tributyltin hydroxide, trimethyltin chloride, trimethyltin bromide, tributyltin chloride, trioctyltin chloride, triphenyltin chloride, tributyltin hydride, triphenyltin hydride, triallyltin chloride, and tributyltin fluoride.

The compounds in group (b) that deserve particular mention and are representative of the group include dimethyltin diacetate, diethyltin diacetate, dibutyltin diacetate, dioctyltin diacetate, dilauryltin diacetate, dibutyltin dilaurate, dibutyltin maleate, dimethyltin dichloride, dibutyltin dichloride, dioctyltin dichloride, diphenyltin dichloride, diallyltin dibromide, diallyltin diiodide, bis(carboethoxymethyl)-tin diiodide, dibutyltin dimethoxide, dibutyltin dibutoxide, $(C_4H_9)_2Sn[OCH_2(CH_2OCH_2)_{x-1}CH_2OCH_3]_2$ (in which $x$ is a positive integer), dibutyl-bis[O-acetylacetonyl]-tin, dibutyltin-bis(thiododecoxide), and

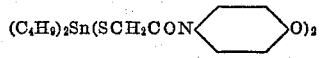

all readily prepared by hydrolysis of the corresponding dihalides. Many commercially available compounds used as stabilizers for vinyl resins are also included in this group.

Among the compounds that are representative of group (c) are butyltin trichloride, octyltin trichloride, butyltin triacetate and octyltin tris(thiobutoxide).

Typical among the compounds of group (d) are dimethyltin oxide, diethyltin oxide, dibutyltin oxide, dioctyltin oxide, dilauryltin oxide, diallyltin oxide, diphenyltin oxide, dibutyltin sulfide, $[HOOC(CH_2)_5]_2SnO$,

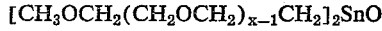

and $[CH_3OCH_2(CH_2OCH_2)_{x-1}CH_2O(CH_2)_5]_2SnO$ (in which the $x$'s are positive integers).

Methylstannonic acid, ethylstannonic acid, butylstannonic acid, octylstannonic acid, $HOOC(CH_2)_5—SnOOH$,

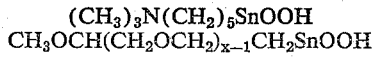

and $CH_3OCH_2(CH_2OCH_2)_{x-1}CH_2O(CH_2)_5SnOOH$ are examples of group (e) catalysts and group (f) catalysts are represented by $HOOSn(CH_2)_xSNOOH$ and

the $x$'s being positive integers.

Typical compounds in group (g) include compounds as poly(dialkyltin oxides) such as dibutyltin basic laurate and dibutyltin basic hexoxide.

Other compounds that are efficient catalysts are those of group (h), of which the organo-tin compounds used as heat and light stabilizers for chlorinated polymers and available under the trade names Advastab 17 M (a dibutyl tin compound believed to contain two sulfur-containing ester groups), Advastab T–50–LT (a dibutyl tin compound believed to contain two ester groups), are typical, as well as many other organo-tin compounds available under such trade names as "Advastab," "Nuostabe" and "Thermolite."

If desired, the above catalysts can be used to accelerate the reaction of the foamant polymer with isocyanate, particularly if the isocyanate-modified foamant is formed immediately before use to form a foam, or if the foaming operation is made continuous.

In order to stabilize the composition during the foaming operation and to avoid breaking of the $CO_2$ bubbles in the early stages of the foaming, it is advantageous to employ a small percentage, e.g., about 0.001 to 10% by weight, based on the total ingredients, of a stabilizing or thickening agent such as methoxylated cellulose, available on the market as "Methocel," ethoxylated cellulose, available as "Ethocel," hydroxy ethylated cellulose, available as "Cellosize," benzyl cellulose, acetyl cellulose, acetylbutyryl cellulose, hydroxyl ethylated polyvinyl alcohol, polyvinyl chloride, vinyl chloride-vinyl acetate copolymers, polyvinyl acetate, polyvinyl butyral, polymeric methylmethacrylate, polymeric butylmethacrylate, high molecular weight polyethylene oxide, bentone, and metallic soaps of fatty acids such as aluminum stearate.

It is within the scope of the invention to add fillers such as clays, powdered aluminum, or diatomaceous earths in quantities up to 20% by weight, based on the weight of total ingredients. Dyes may also be added prior to the foaming step and are often desirable since polyurethane foams normally exhibit a slight tendency to yellow on aging.

It is also within the scope of the invention to employ small amounts, e.g., about 0.1 to 5% by weight, based on the total ingredients, of an emulsifying agent such as a siloxane-oxyalkylene copolymer having from about 10 to 80% by weight of siloxane polymer and from 90 to 20 percent by weight of alkylene oxide polymer, such as the copolymers described in U.S. Patent 2,834,748. Although the use of an emulsifier is desirable to influence the type of foam structure that is formed, the foam products of the invention can be prepared without emulsifiers.

The foam products of the invention can readily be prepared to have, in addition to the characteristics already referred to, densities advantageously within the range of about 1.0 to 30 lbs. per cubic foot. Within this range, densities of the order of 1.5 to 15 lbs. per cubic foot are generally preferred for rigid structural foams.

The utility and advantages of the product and methods of the invention will become more apparent from the following examples included to illustrate the best modes now contemplated for carrying out the invention.

In evaluating the compression properties of the foams produced in the various examples, a foam cube of 2 x 2 x 2 inches was subjected to a compression load in an Instron tester and a load-deflection curve was obtained. The maximum compressive strength is given in lbs. per square inch (p.s.i.) either at the yield point or at 10% deflection.

*Example I*

140 grams of a propylene oxide adduct of 3,3,5,5-tetrakis(hydroxymethyl)-4-hydroxy-tetrahydropyran having a hydroxyl No. of about 357 is mixed with 0.89 gram of dibutyltin dilaurate, 1.3 grams of a silicone oil surfactant (a siloxaneoxyalkylene copolymer) and 41 grams of trichloromonofluoromethane. 85.5 grams of a mixture of 80%, 2,4- and 20% 2,6-tolylene diisocyanates is added under intensive agitation. As soon as the foaming reaction begins the mixture is transferred into an open mold and allowed to cure for 10 minutes at 70° C. The foamed product has a density of about 1.9 lbs./cu. ft. and a maximum compression of about 26 lbs./sq. in. at 5.3% deflection.

*Example II*

140 grams of a propylene oxide adduct of 3,3,5-tris-(hydroxymethyl) - 5 - methyl - 4-hydroxy-tetrahydropyran having a hydroxyl No. of about 347 is mixed with 0.5 gram of dibutyltin diacetate, 1.3 grams of a silicone oil surfactant (a siloxane-oxyalkylene copolymer) and 41 grams of trichloromonofluoromethane. 76 grams of a mixture of 80% 2,4- and 20% 2,6-tolylene diisocyanates is added under intensive agitation. As soon as the foaming reaction begins the mixture is transferred into an open mold and allowed to cure for 10 minutes at 70° C. The foamed product has a density of about 2 lbs./cu. ft.

*Example III*

150 grams of an ethylene oxide-propylene oxide adduct of 3,5 - (hydroxymethyl) - 3,5 - dimethyl-4-hydroxy-tetrahydropyran having a hydroxyl No. of about 168 is mixed with 0.5 gram of dibutyltin dichloride, 0.1 gram of triethylamine, 1.3 grams of a silicone oil surfactant (a siloxane-oxyalkylene copolymer), and 3.75 grams of water. 76 grams of a mixture of 80% 2,4- and 20% 2,6-tolylene diisocyanates is added under intensive agitation. As soon as the foaming reaction begins the mixture is transferred into an open mold and allowed to cure for 10 minutes at 120° C. The foamed product has a density of about 2 lbs./cu. ft.

*Example IV*

140 grams of the foamant polymer of Example I are mixed with 2.6 grams of water, 0.5 gram of a silicone oil surfactant (a siloxane-oxyalkylene copolymer) and 0.5 gram of dioctyltin oxide. 105 grams of a mixture of 80% of 2,4- and 20% 2,6-toluene diisocyanates containing 0.10% "Ethocel," an ethoxylated cellulose having an average ethoxy content of 47.5 to 49%, is then added under intensive agitation. As soon as the foaming reaction begins the mixture is transferred into an open mold and allowed to set for 24 hours at room temperature for complete curing. The foamed product has a density of approximately 3.0 lbs./cu. ft.

What is claimed is:

1. A foamed polymer comprising a network of isocyanate-modified hydroxypolyalkyleneoxy ethers of substituted tetrahydropyrans in which said ethers are connected to organic polyisocyanate residues by means of urethane groups, said ethers having the formula:

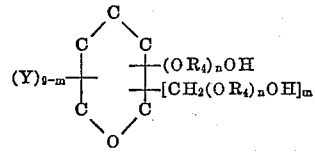

in which Y represents a member selected from the group consisting of hydrogen atoms and lower alkyl groups; $R_4$ is a member selected from the group consisting of ethylene radicals, propylene radicals and mixtures thereof; $m$ is an integer of 2 to 4; and $n$ is a number having a value of at least one.

2. The foamed polymer of claim 1 wherein $R_4$ is an ethylene radical.

3. The foamed polymer of claim 1 wherein $R_4$ is a propylene radical.

4. A foamed polymer comprising a network of isocyanate-modified hydroxypolyalkyleneoxy ethers of a substituted tetrahydropyran in which the ethers are connected to organic polyisocyanate residues by means of urethane groups, said ether consisting essentially of the reaction product of a 4-hydroxy-tetrahydropyran containing two to four hydroxymethyl groups and an alkylene oxide selected from the group consisting of ethylene oxide, propylene oxide and mixtures thereof.

5. The foamed polymer of claim 4 wherein said ether has a molecular weight within the range of 350 to 6000.

6. The foamed polymer of claim 5 wherein the tetrahydropyran is 3,3,5,5-tetrakis(hydroxymethyl)-4-hydroxytetrahydropyran.

7. The foamed polymer of claim 5 wherein the tetrahydropyran is 3,3,5 - tris(hydroxymethyl) - 5 - methyl-4-hydroxytetrahydropyran.

8. The foamed polymer of claim 5 wherein the tetrahydropyran is 3,5 - (hydroxymethyl) - 3,5 - dimethyl-4-hydroxytetrahydropyran.

9. A method for preparing rigid, cellular polyurethane foams from hydroxypolyalkyleneoxy ethers of tetrahydropyrans having a molecular weight of about 350 to 1250 prepared by reaction of an alkylene oxide selected from the group consisting of ethylene oxide, propylene oxide and mixtures thereof with a tetrahydropyran compound selected from the group consisting of 3,3,5,5-tetrakis(hydroxymethyl) - 4 - hydroxy-tetrahydropyran, 3,3,5-tris(hydroxymethyl) - 5 - methyl - 4 - hydroxy-tetrahydropyran, and 3,5-(hydroxymethyl)-3,5-dimethyl-4-hydroxytetrahydropyran, which comprises catalytically reacting said ethers with at least an equivalent amount of organic polyisocyanate in the presence of a low-boiling fluorocarbon, and permitting the temperature of the reaction mixture to rise above the boiling point of said fluorocarbon whereby a rigid, cellular polyurethane foam is produced.

10. The method of claim 9 wherein the alkylene oxide is ethylene oxide.

11. The method of claim 9 wherein the alkylene oxide is propylene oxide.

12. The method of claim 11 wherein the tetrahydropyran is 3,3,5,5-tetrakis(hydroxymethyl)-4-hydroxytetrahydropyran.

13. The method of claim 12 wherein the fluorocarbon is trichloromonofluoromethane.

References Cited in the file of this patent

UNITED STATES PATENTS

| | | |
|---|---|---|
| 2,843,568 | Benning et al. | July 15, 1958 |
| 2,866,774 | Price | Dec. 30, 1958 |

UNITED STATES PATENT OFFICE
CERTIFICATE OF CORRECTION

Patent No. 3,022,256                  February 20, 1962

Robert K. Barnes et al.

It is hereby certified that error appears in the above numbered patent requiring correction and that the said Letters Patent should read as corrected below.

Column 4, line 56, for "preacting" read -- prereacting --; column 8, line 43, for "$CH_3OCH(CH_2OCH_2)_{x-1}CH_2SnOOH$" read -- $CH_3OCH_2(CH_2OCH_2)_{x-1}CH_2SnOOH$ --.

Signed and sealed this 9th day of October 1962.

(SEAL)
Attest:

ERNEST W. SWIDER
Attesting Officer

DAVID L. LADD
Commissioner of Patents